(12) United States Patent
Chae et al.

(10) Patent No.: US 9,348,187 B2
(45) Date of Patent: May 24, 2016

(54) DISPLAY DEVICE

(71) Applicant: Samsung Display Co., Ltd., Yongin, Gyeonggi-Do (KR)

(72) Inventors: Kyung Tae Chae, Hwaseong-si (KR); Won Tae Kim, Suwon-si (KR); Sun Hwa Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 78 days.

(21) Appl. No.: 14/476,577

(22) Filed: Sep. 3, 2014

(65) Prior Publication Data

US 2015/0293414 A1  Oct. 15, 2015

(30) Foreign Application Priority Data

Apr. 15, 2014  (KR) .................. 10-2014-0044981

(51) Int. Cl.
| | | |
|---|---|---|
| *G02F 1/1362* | (2006.01) | |
| *G02F 1/1333* | (2006.01) | |
| *G02F 1/1334* | (2006.01) | |
| *G02F 1/1337* | (2006.01) | |
| *G02F 1/1343* | (2006.01) | |

(52) U.S. Cl.
CPC ...... *G02F 1/13624* (2013.01); *G02F 1/133377* (2013.01); *G02F 1/1334* (2013.01); *G02F 1/133707* (2013.01); *G02F 2001/134345* (2013.01)

(58) Field of Classification Search
CPC .................................................. G02F 1/133377
See application file for complete search history.

(56) References Cited

U.S. PATENT DOCUMENTS

2013/0188117 A1*  7/2013  Itou .................. G02F 1/133377
                                              349/106

FOREIGN PATENT DOCUMENTS

| KR | 10-2011-0070475 A | 6/2011 |
| KR | 10-2013-0101329 A | 9/2013 |
| KR | 10-2014-0062286 | 5/2014 |

* cited by examiner

*Primary Examiner* — Wen-Ying P Chen
(74) *Attorney, Agent, or Firm* — Innovation Counsel LLP (57) ABSTRACT

A display device capable of reducing a resistance of a common electrode is presented. The display device includes: a substrate; a gate line, a data line, and a storage electrode line formed on the substrate; a thin film transistor connected to the gate line and the data line; a pixel electrode connected with the thin film transistor; a common electrode formed on the pixel electrode; a plurality of microcavities between the common electrode and the pixel electrode; a roof layer formed on the common electrode; a liquid crystal layer in the microcavity; and an encapsulation layer formed on the roof layer to seal the microcavity, wherein the common electrode is connected with the storage electrode line at a position adjacent to the data line.

13 Claims, 9 Drawing Sheets

DISPLAY DEVICE

CROSS-REFERENCE TO RELATED APPLICATION

This application claims priority to and the benefit of Korean Patent Application No. 10-2014-0044981 filed in the Korean Intellectual Property Office on Apr. 15, 2014, the entire contents of which are incorporated herein by reference.

BACKGROUND (a) Technical Field

The present invention relates to a display device, and more particularly, to a display device capable of reducing common electrode resistance.

(b) Description of the Related Art

A liquid crystal display, which is one of the most common types of flat panel displays currently in use, includes two sheets of display panels with field generating electrodes such as a pixel electrode, a common electrode, and the like, and a liquid crystal layer interposed therebetween. The liquid crystal display generates an electric field in the liquid crystal layer by applying a voltage to the field generating electrodes to determine alignment of liquid crystal molecules through the generated electric field and control polarization of incident light, thereby displaying images.

Two sheets of display panels that make up the liquid crystal display may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display in the related art, two sheets of substrates are necessarily used, and respective constituent elements are formed on the two sheets of substrates, and as a result, there are problems in that the display device is heavy and thick, has high cost, and has a long processing time.

The above information disclosed in this Background section is only for enhancement of understanding of the background of the invention and therefore it may contain information that does not form the prior art that is already known in this country to a person of ordinary skill in the art.

SUMMARY

The inventive concept disclosed herein provides a display device having advantages of reducing the weight, thickness, cost, and processing time by manufacturing the display device by using no more than one substrate.

Further, the inventive concept provides a display device having advantages of preventing a cross talk that is generated by the high resistance of a common electrode formed in a line shape.

In one aspect, the inventive concept provides a display device including: a substrate; a gate line, a data line, and a storage electrode line formed on the substrate; a thin film transistor connected to the gate line and the data line; a pixel electrode connected with the thin film transistor; a common electrode formed on the pixel electrode; a plurality of microcavities between the common electrode and the pixel electrode; a roof layer formed on the common electrode; a liquid crystal layer in the microcavity; and an encapsulation layer formed on the roof layer to seal the microcavity, wherein the common electrode is connected with the storage electrode line at a position adjacent to the data line, spaced apart from the microcavities.

The microcavities may be disposed in a matrix form, and the display device may further include first valleys positioned between the microcavities which are adjacent to each other in a column direction and second valleys positioned between the microcavities which are adjacent to each other in a row direction.

The common electrode may be connected with the storage electrode line at the second valley.

The data line may include a first data line and a second data line, and the first data line and the second data line may be positioned at both edges of the second valley, respectively.

The display device may further include an insulating layer formed between the storage electrode line and the common electrode, a contact hole extending through the insulating layer to at least a part of the storage electrode line positioned between the first data line and the second data line, wherein the common electrode may be connected with the storage electrode line through the contact hole.

The contact hole may be formed between the first data line and the second data line without reaching the first data line or the second data line.

The thin film transistor may include a first thin film transistor and a second thin film transistor, the pixel electrode may include a first subpixel electrode and a second subpixel electrode, the first thin film transistor may be connected with the first data line and the first subpixel electrode, and the second thin film transistor may be connected with the second data line and the second subpixel electrode.

A data voltage applied to the second data line may be different from a data voltage applied to the first data line.

The common electrode may be connected with the storage electrode line in the first valley.

The common electrode may be attached to the substrate in the first valley and the second valley.

A portion of the common electrode that is attached to the substrate may have an L-shape.

The display device may further include a capacitive electrode protruding from the storage electrode line, in which the common electrode may be directly connected with the capacitive electrode.

The display device may further include an insulating layer formed between the storage electrode line and the common electrode, and a contact hole extending through the insulating layer to at least a part of the capacitive electrode, wherein the common electrode may be connected with the capacitive electrode through the contact hole.

According to the exemplary embodiment of the present invention, the common electrode is connected with the storage electrode line, thereby reducing a resistance of the common electrode.

DETAILED DESCRIPTION OF THE EMBODIMENTS

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display device according to an exemplary embodiment of the inventive concept will be schematically described below with reference to FIG. 1.

Figure 1:
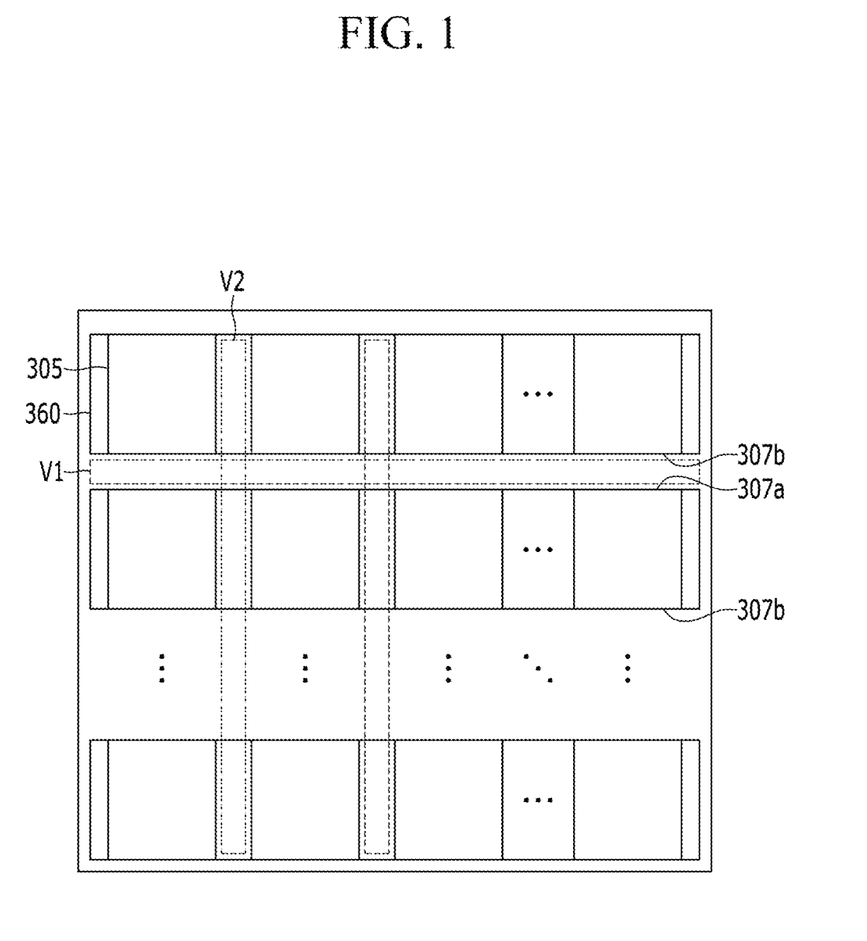
FIG. 1 is a plan view illustrating a display device according to an exemplary embodiment of the present inventive concept.

FIG. 1 is a plan view illustrating a display device according to an exemplary embodiment of the inventive concept.

A display device according to the exemplary embodiment of the present invention includes a substrate 110 made of a material such as glass or plastic.

A microcavity 305 covered by a roof layer 360 is formed on the substrate 110. The roof layers 360 extend in a row direction, and a plurality of microcavities 305 is formed below one roof layer 360.

The microcavities 305 may be disposed in a matrix form. First valleys V1 are positioned between the microcavities 305 adjacent to each other in a column direction, and second valleys V2 are positioned between the microcavities 305 adjacent to each other in a row direction.

The plurality of roof layers 360 are separated from each other with the first valleys V1 therebetween. The microcavity 305 is not covered by the roof layer 360, but may be exposed outside at a portion contacting the first valley V1. This is called injection holes 307a and 307b.

The injection holes 307a and 307b are formed at both edges of the microcavity 305. The injection holes 307a and 307b are configured by a first injection hole 307a and a second injection hole 307b, the first injection hole 307a is formed to expose a side of a first edge of the microcavity 305, and the second injection hole 307b is formed to expose a side of a second edge of the microcavity 305. The side of the first edge and the side of the second edge of the microcavity 305 face each other.

Each roof layer 360 is formed to be separated from the substrate 110 between the adjacent second valleys V2 to form the microcavity 305. That is, the roof layer 360 is formed to cover all sides of the microcavity 305 except for the sides adjacent to the first edge and the second edge where the injection holes 307a and 307b are formed.

The structure of the display device according to the exemplary embodiment described above is just exemplary, and may be modified in various ways. For example, the layout of the microcavities 305, the first valleys V1, and the second valleys V2 may be adjusted. The plurality of roof layers 360 may be connected to each other at an area above the first valleys V1 and separated from the substrate 110 at the second valley V2, thus connecting the adjacent microcavities 305 to each other.

Hereinafter, one pixel of the display device according to the exemplary embodiment of the inventive concept will be schematically described below with reference to FIG. 2.

Figure 2:
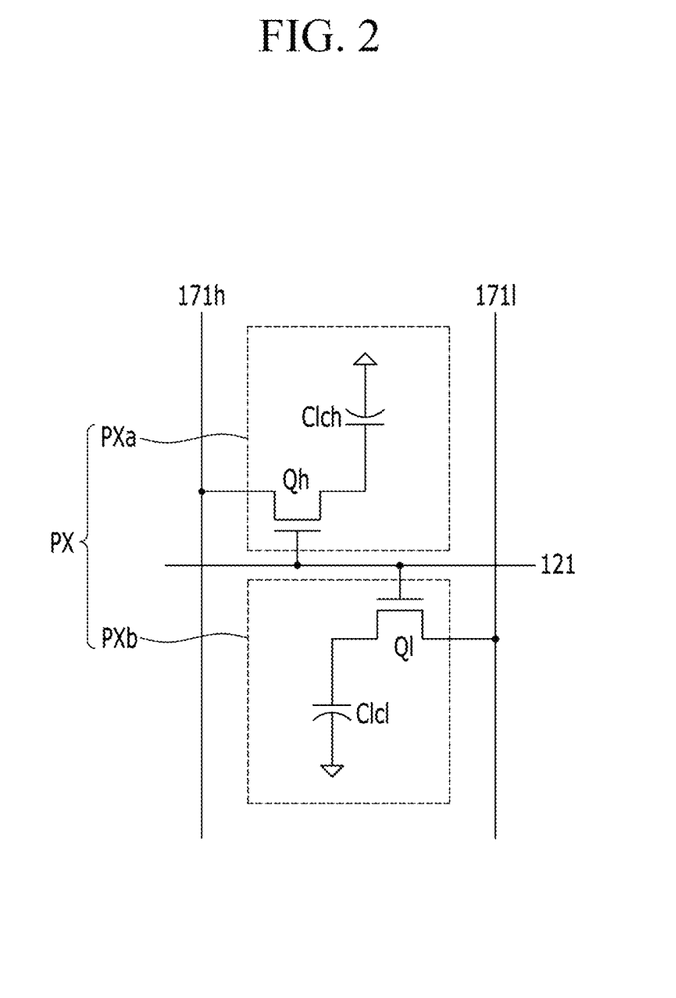
FIG. 2 is an equivalent circuit diagram of one pixel of the display device according to an exemplary embodiment of the present inventive concept.

FIG. 2 is an equivalent circuit diagram of one pixel of the display device according to the exemplary embodiment of the inventive concept.

The display device according to the exemplary embodiment includes a plurality of signal lines 121, 171h, and 171l, and pixels PX connected thereto. Although not illustrated, a plurality of pixels PX may be disposed in a matrix form which includes a plurality of pixel rows and a plurality of pixel columns.

Each pixel PX may include a first subpixel PXa and a second subpixel PXb. The first subpixel PXa and the second subpixel PXb may be vertically disposed. In this case, the first valley V1 may be positioned between the first subpixel PXa and the second subpixel PXb in a pixel row direction, and a second valley V2 may be positioned between the plurality of pixel columns.

The signal lines 121, 171h, and 171l include a gate line 121 transferring a gate signal, and a first data line 171h and a second data line 171l transferring different data voltages.

A first thin film transistor Qh connected to the gate line 121 and the first data line 171h is formed, and a second thin film transistor Ql connected to the gate line 121 and the second data line 171l is formed.

In the first subpixel PXa, a first liquid crystal capacitor Clch connected to a first thin film transistor Qh is formed, and in the second subpixel PXb, a second liquid crystal capacitor Clcl connected to a second thin film transistor Ql is formed.

A first terminal of the first thin film transistor Qh is connected to the gate line 121, a second terminal is connected to the first data line 171h, and a third terminal is connected to the first liquid crystal capacitor Clch.

A first terminal of the second thin film transistor Ql is connected to the gate line 121, a second terminal is connected to the second data line 171l, and a third terminal is connected to the second liquid crystal capacitor Clcl.

In an operation of a display device according to the exemplary embodiment, when a gate-on voltage is applied to the gate line 121, the first thin film transistor Qh and the second thin film transistor Ql connected thereto are turned on, and the first and second liquid crystal capacitors Clch and Clcl are charged by different data voltages transferred through the first and second data lines 171h and 171l. The data voltage transferred by the second data line 171l is lower than the data voltage transferred by the first data line 171h. Accordingly, the second liquid crystal capacitor Clcl is charged at a different voltage (e.g., a lower voltage) than that of the first liquid crystal capacitor Clch, thereby improving side visibility. "Side visibility," as used herein, refers to how images look when the display panel is viewed at an angle, from a position that is off-center.

Hereinafter, a structure of one pixel of the display device according to the exemplary embodiment of the present invention will be described with reference to FIGS. 3 to 5.

Figure 3:
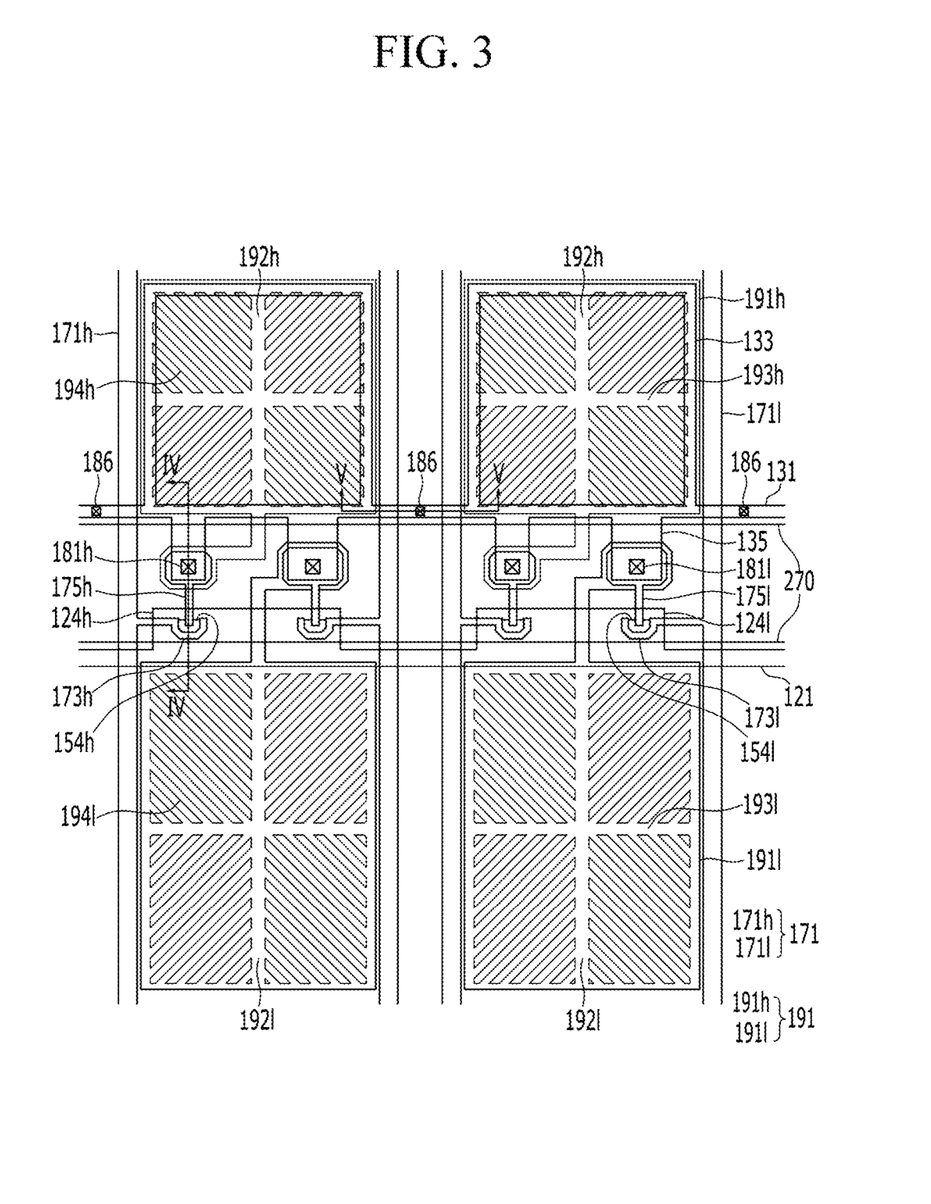
FIG. 3 is a layout view illustrating a part of the display device according to an exemplary embodiment of the present inventive concept.
Figure 4:
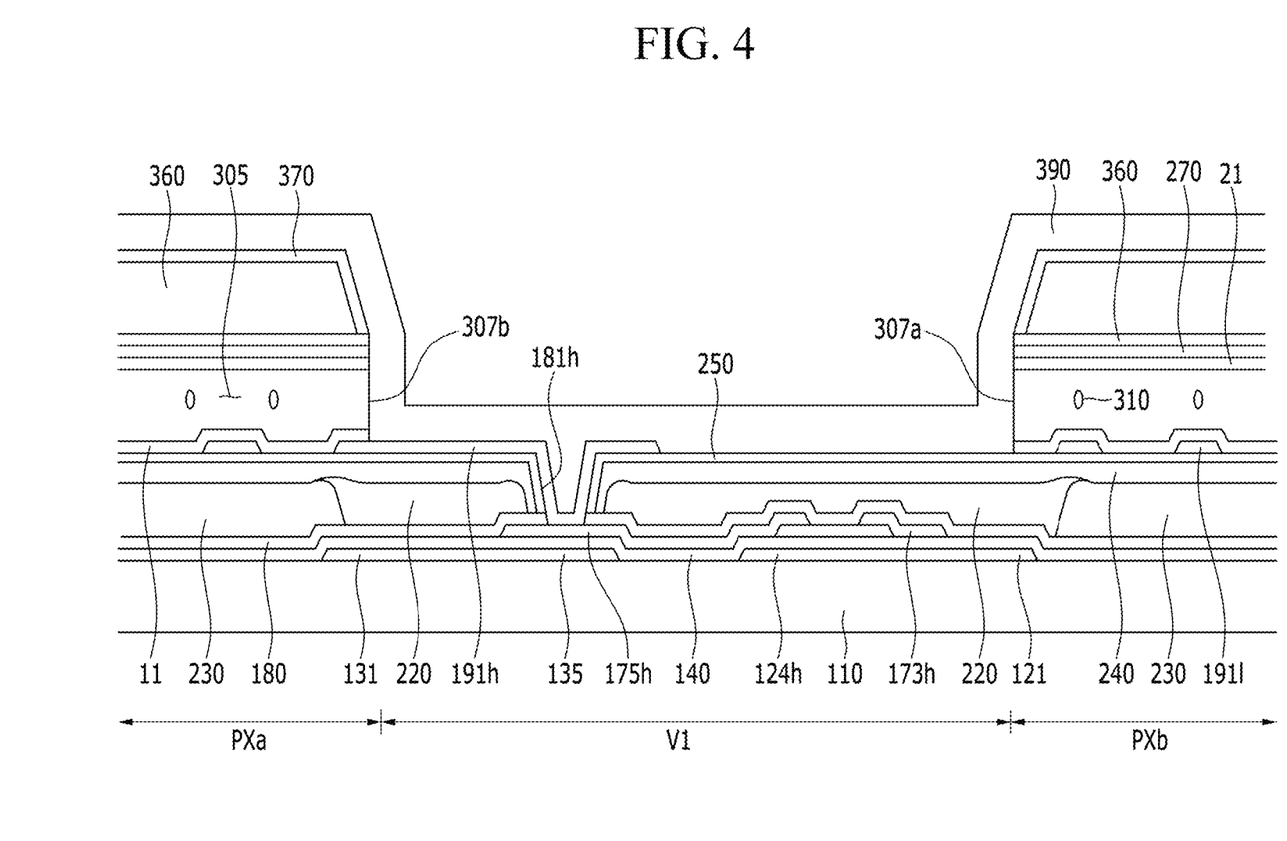
FIG. 4 is a cross-sectional view illustrating the display device taken along line IV-IV according to an exemplary embodiment of the present inventive concept.

FIG. 3 is a layout view illustrating one pixel of the display device according to the exemplary embodiment of the inventive concept, and FIG. 4 is a cross-sectional view illustrating the display device taken along line IV-IV according to the exemplary embodiment of the inventive concept. FIG. 5 is a cross-sectional view illustrating the display device taken along line V-V according to the exemplary embodiment of the inventive concept.

Figure 5:
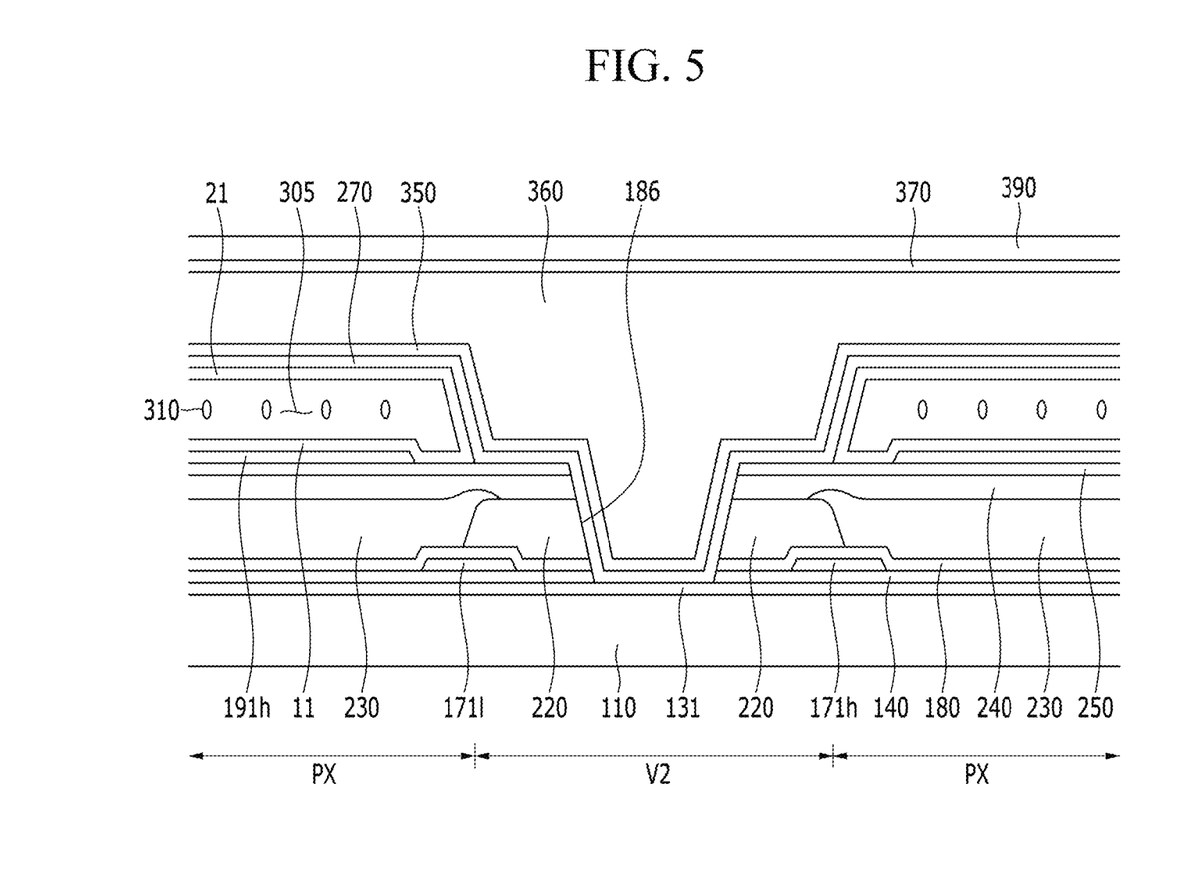
FIG. 5 is a cross-sectional view illustrating the display device taken along line V-V according to an exemplary embodiment of the present inventive concept.

Referring to FIGS. 3 to 5, a gate line 121, a first gate electrode 124h, and a second gate electrode 124l which protrude from the gate line 121 are formed on the substrate 110.

The gate line 121 extends in a first direction and transfers a gate signal. The gate line 121 is positioned between two microcavities 305 which are adjacent to each other in a column direction. That is, the gate line 121 is positioned on the first valley V1. The first gate electrode 124h and the second gate electrode 124l protrude from the gate line 121, as shown in FIG. 3. The first gate electrode 124h and the second gate electrode 124l are connected with each other to form one protrusion. However, the present invention is not limited thereto, and the protruding form of the first gate electrode 124h and the second gate electrode 124l may be modified in various ways.

A storage electrode line 131, and storage electrodes 133 and 135 protruding from the storage electrode line 131 may be further formed on the substrate 110.

The storage electrode line 131 extends in a direction parallel to the gate line 121, and is formed to be spaced apart from the gate line 121. A predetermined voltage may be applied to the storage electrode line 131. The storage electrode 133 protruding above the storage electrode line 131 is formed to surround an edge of the first subpixel PXa. The storage electrode 135 protruding below the storage electrode line 131 is formed to be adjacent to the first gate electrode 124h and the second gate electrode 124l.

A gate insulating layer 140 is formed on the gate line 121, the first gate electrode 124h, the second gate electrode 124l, the storage electrode line 131, and the storage electrodes 133 and 135. The gate insulating layer 140 may be made of an inorganic insulating material such as silicon nitride (SiNx) and silicon oxide (SiOx). Further, the gate insulating layer 140 may be formed as a single layer or a multiple layer.

A first semiconductor 154h and a second semiconductor 154l are formed on the gate insulating layer 140. The first semiconductor 154h may be positioned on the first gate electrode 124h, and the second semiconductor 154l may be positioned on the second gate electrode 124l. The first semiconductor 154h may be formed even below the first data line 171h, and the second semiconductor 154l may be formed even below the second data line 171l. The first semiconductor 154h and the second semiconductor 154l may be made of amorphous silicon, polycrystalline silicon, metal oxide, and the like.

An ohmic contact member (not illustrated) may be further formed on each of the first semiconductor 154h and the second semiconductor 154l. The ohmic contact member may be made of silicide or a material such as n+ hydrogenated amorphous silicon in which n-type impurity is doped at a high concentration.

On the first semiconductor 154h, the second semiconductor 154l and the gate insulating layer 140, the first data line 171h, the second data line 171l, the first source electrode 173h, the first drain electrode 175h, the second source electrode 173l, and the second drain electrode 175l are formed.

The first data line 171h and the second data line 171l transfer data signals and extend in a second direction to cross the gate line 121 and the storage electrode line 131. The data line 171 is positioned between two microcavities 305 which are adjacent to each other in a row direction. That is, the data line 171 is positioned at the second valley V2. The first data line 171h and the second data line 171l are positioned at both edges of the second valley V2, respectively.

The first data line 171h and the second data line 171l transfer different data voltages. The data voltage transferred by the second data line 171l is lower than the data voltage transferred by the first data line 171h.

The first source electrode 173h protrudes above the first gate electrode 124h from the first data line 171h, and the second source electrode 173l protrudes above the second gate electrode 124l from the second data line 171l. Each of the first drain electrode 175h and the second drain electrode 175l includes one wide end portion and the other rod-shaped end portion. The wide end portions of the first drain electrode 175h and the second drain electrode 175l overlap with the storage electrode 135 protruding below the storage electrode line 131. The rod-shaped end portions of the first drain electrode 175h and the second drain electrode 175l are partially surrounded by the first source electrode 173h and the second source electrode 173l, respectively.

The first and second gate electrodes 124h and 124l, the first and second source electrodes 173h and 173l, and the first and second drain electrodes 175h and 175l form first and second thin film transistors (TFTs) Qh and Ql together with the first and second semiconductors 154h and 154l, respectively, and a channel of the thin film transistor is formed in each of the semiconductors 154h and 154l between each of the source electrodes 173h and 173l and each of the drain electrodes 175h and 175l.

A passivation layer 180 is formed on the first data line 171h, the second data line 171l the first source electrode 173h, the first drain electrode 175h, the first semiconductor 154h exposed between the first source electrode 173h and the first drain electrode 175h, the first semiconductor 154h, the second source electrode 173l, the second drain electrode 175l, and the second semiconductor 154l exposed between the second source electrode 173l and the second drain electrode 175l. The passivation layer 180 may be made of an organic insulating material or an inorganic insulating material, and may be formed as a single layer or a multiple layer.

A color filter 230 in each pixel PX is formed on the passivation layer 180.

Each color filter 230 may display one of the primary colors such as three primary colors of red, green and blue. The color filter 230 is not limited to the three primary colors of red, green and blue, but may display cyan, magenta, yellow, and white-based colors. The color filter 230 may not be formed at the first valley V1.

A light blocking member 220 is formed in a region between the adjacent color filters 230. The light blocking member 220 is formed on a boundary of the pixel PX and the thin film transistors Qh and Ql to prevent light leakage. That is, the light blocking member 220 may be formed at the first valley V1 and the second valley V2. The color filter 230 and the light blocking member 220 may overlap with each other in a partial region.

A first insulating layer 240 may be further formed on the color filter 230 and the light blocking member 220. The first insulating layer 240 may be made of an organic insulating material, and may serve to planarize the color filters 230.

A second insulating layer 250 may be further formed on the first insulating layer 240. The second insulating layer 250 may be made of an inorganic insulating material, and may serve to protect the color filters 230 and the first insulating layer 240.

In the passivation layer 180, the first insulating layer 240, and the second insulating layer 250, a first contact hole 181h exposing the wide end portion of the first drain electrode 175h is formed, and a second contact hole 181l exposing the wide end portion of the second drain electrode 175l are formed.

A pixel electrode 191 is formed on the second insulating layer 250. The pixel electrode 191 may be made of a transparent metal material such as indium tin oxide (ITO) and indium zinc oxide (IZO).

The pixel electrode 191 includes a first subpixel electrode 191h and a second subpixel electrode 191l which are separated from each other with the gate line 121 and the storage electrode line 131 therebetween. The first subpixel electrode 191h and the second subpixel electrode 191l are disposed above and below the pixel PX based on the gate line 121 and the storage electrode line 131. That is, the first subpixel electrode 191h and the second subpixel electrode 191l are separated from each other with the first valley V1 therebetween, the first subpixel electrode 191h is positioned in the first subpixel PXa, and the second subpixel electrode 191l is positioned in the second subpixel PXb.

The first subpixel electrode 191h is connected with the first drain electrode 175h through the first contact hole 181h, and the second subpixel electrode 191l is connected to the second drain electrode 175l through the second contact hole 181l. Accordingly, when the first thin film transistor Qh and the second thin film transistor Ql are turned on, the first subpixel electrode 191h and the second subpixel electrode 191l receive different data voltages from the first drain electrode 175h and the second drain electrode 175l, respectively. An electric field may be generated between the pixel electrodes 191h, 191l and the common electrode 270.

The general shape of each of the first subpixel electrode 191h and the second subpixel electrode 191l is a quadrangle, and the first subpixel electrode 191h and the second subpixel electrode 191l include cross stems including horizontal stems 193h and 193l and vertical stems 192h and 192l crossing the horizontal stems 193h and 193l, respectively. Further, each of the first subpixel electrode 191h and the second subpixel electrode 191l includes a plurality of minute branches 194h and 194l.

The pixel electrode 191 is divided into four subregions by the horizontal stems 193h and 193l and the vertical stems 192h and 192l. The minute branches 194h and 194l obliquely extend from the horizontal stems 193h and 193l and the vertical stems 192h and 192l, and the extending direction may form an angle of approximately 45 degrees or 135 degrees with the gate line 121 or the horizontal stems 193h and 193l. Further, extending directions of the minute branches 194h and 194l of the two adjacent subregions may be perpendicular to each other.

In the exemplary embodiment, the first subpixel electrode 191h and the second subpixel electrode 191l may further include outer stems surrounding outsides of the first subpixel PXa and the second subpixel PXb.

The layout form of the pixel, the structure of the thin film transistor, and the shape of the pixel electrode described above are just exemplary, and the inventive concept is not limited thereto and may be modified in various ways.

The common electrode 270 is formed on the pixel electrode 191 so as to be spaced apart from the pixel electrode 191 at a predetermined distance. The microcavity 305 is formed between the pixel electrode 191 and the common electrode 270. That is, the microcavity 305 is surrounded by the pixel electrode 191 and the common electrode 270. The common electrode 270 is formed in a row direction, and formed on the microcavity 305 and at the second valley V2. The common electrode 270 is formed to cover an upper surface and a side of the microcavity 305. A width and an area of the microcavity 305 may be variously modified according to a size and a resolution of the display device.

In each pixel PX, the common electrode 270 is formed to be separated from the substrate 110 and thus the microcavity 305 is formed, but the common electrode 270 is formed to be attached to the substrate 110 in the second valley V2. At the second valley V2, the common electrode 270 is formed directly on the second insulating layer 250. No space is formed between the second insulating layer 250 and the common electrode 270.

The storage electrode line 131 and the common electrode 270 are overlapped with each other. Insulating layers such as the gate insulating layer 140, the passivation layer 180, the light blocking member 220, the first insulating layer 240, and the second insulating layer 250 are formed between the storage electrode line 131 and the common electrode 270. A third contact hole 186 is formed in the insulating layers. The third contact hole 186 passing through the gate insulating layer 140, the passivation layer 180, the light blocking member 220, the first insulating layer 240, and the second insulating layer 250 is formed to extend to at least a part of the storage electrode line 131 (see FIG. 5). The third contact hole 186 is positioned at the second valley V2, and positioned between the first data line 171h and the second data line 171l. The third contact hole 186 does not extend to the first data line 171h and the second data line 171l.

The common electrode 270 is connected with the storage electrode line 131 through the third contact hole 186. The common electrode 270 is connected with the storage electrode line 131 at a position adjacent to the data line 171. The common electrode 270 is connected with the storage electrode line 131 between the first data line 171h and the second data line 171l. That is, the common electrode 270 is connected with the storage electrode line 131 at the second valley V2. In this case, since the data line 171 is not exposed by the third contact hole 186, the data line 171 is not connected with the common electrode 270.

In the exemplary embodiment, a plurality of common electrodes 270 is formed in a row direction. Accordingly, the resistance of the common electrode 270 may be increased in comparison with a case where the common electrode 270 is entirely formed on the substrate 110 as one planar electrode. In the exemplary embodiment, the resistance of the common electrode 270 may be reduced by connecting the common electrode 270 with the storage electrode line 131. In this case, the same common voltage may be applied to the storage electrode line 131 and the common electrode 270.

The common electrode 270 may be made of a transparent metal material such as indium tin oxide (ITO) and indium zinc oxide (IZO). A predetermined voltage may be applied to the common electrode 270, and an electric field may be generated between the pixel electrode 191 and the common electrode 270.

A first alignment layer 11 is formed on the pixel electrode 191. The first alignment layer 11 may also be formed directly on the second insulating layer 250 which is not covered by the pixel electrode 191.

A second alignment layer 21 is formed below the common electrode 270 to face the first alignment layer 11.

The first alignment layer 11 and the second alignment layer 21 may be formed by vertical alignment layers, and made of alignment materials such as polyamic acid, polysiloxane, and polyimide. The first and second alignment layers 11 and 21 may be connected to each other at a side wall of the edge of the microcavity 305.

A liquid crystal layer configured by liquid crystal molecules 310 is formed in the microcavity 305 positioned between the pixel electrode 191 and the common electrode 270. The liquid crystal molecules 310 have negative dielectric anisotropy, and may stand up in a vertical direction to the substrate 110 while the electric field is not applied. That is, vertical alignment may be performed.

The first subpixel electrode 191h and the second subpixel electrode 191l to which the data voltages are applied generate an electric field together with the common electrode 270 to determine the alignment directions of the liquid crystal molecules 310 positioned in the microcavity 305 between the two electrodes 191 and 270. Luminance of light passing through the liquid crystal layer varies according to the alignment directions of the liquid crystal molecules 310.

A third insulating layer 350 may be further formed on the common electrode 270. The third insulating layer 350 may be made of an inorganic insulating material such as silicon nitride (SiNx) and silicon oxide (SiOx), and may be omitted if necessary.

A roof layer 360 is formed on the third insulating layer 350. The roof layer 360 may be made of an organic material. The roof layer 360 is formed in a row direction, and formed on the microcavity 305 and at the second valley V2. The roof layer 360 is formed to cover an upper surface and a side of the microcavity 305. The roof layer 360 is hardened by a curing process to serve to maintain the shape of the microcavity 305. The roof layer 360 is formed to be spaced apart from the pixel electrode 191 with the microcavity 305 therebetween.

The common electrode 270 and the roof layer 360 are formed to expose the side of the edge of the microcavity 305, and portions where the microcavity 305 is not covered by the common electrode 270 and the roof layer 360 are called injection holes 307a and 307b. The injection holes 307a and 307b include a first injection hole 307a exposing the side of the first edge of the microcavity 305 and a second injection hole 307b exposing the side of the second edge of the microcavity 305. The first edge and the second edge face each other, and sometimes, the first edge may be an upper edge of the microcavity 305, and the second edge may be a lower edge of the microcavity 305. The injection holes 307a and 307b expose edge sides of the microcavity 305 adjacent to the first valley V1. Since the microcavity 305 is exposed by the injection holes 307a and 307b, an aligning agent, a liquid crystal material, or the like may be injected into the microcavity 305 through the injection holes 307a and 307b.

In the exemplary embodiment, the common electrode 270 is connected with the storage electrode line 131. In this case, when a position where the common electrode 270 and the storage electrode line 131 are connected with each other is at a center of the injection holes 307a and 307b, injection of an aligning agent or a liquid crystal material may be disturbed. In the exemplary embodiment of the inventive concept, since the common electrode 270 and the storage electrode line 131 are connected with each other at a position beyond the injection holes 307a and 307b, the injection of an aligning agent or a liquid crystal material may be easily performed. Further, in the exemplary embodiment, there is minimal loss of an aperture ratio by the connection of the common electrode 270 and the storage electrode line 131.

A fourth insulating layer 370 may be further formed on the roof layer 360. The fourth insulating layer 370 may be made of an inorganic insulating material such as silicon nitride (SiNx) and silicon oxide (SiOx). The fourth insulating layer 370 may be formed to cover an upper surface and a side of the roof layer 360. The fourth insulating layer 370 serves to protect the roof layer 360 made of an organic material, and may be omitted if necessary.

An encapsulation layer 390 is formed on the fourth insulating layer 370. The encapsulation layer 390 is formed to cover the injection holes 307a and 307b by which a part of the microcavity 305 is exposed. That is, the encapsulation layer 390 may seal the microcavity 305 so that the liquid crystal molecules 310 formed in the microcavity 305 are not discharged outside. Since the encapsulation layer 390 contacts the liquid crystal molecules 310, the encapsulation layer 390 may be made of a material which does not react with liquid crystal molecules 310. For example, the encapsulation layer 390 may be made of parylene and the like.

The encapsulation layer 390 may be formed by a multi-layer such as a double layer and a triple layer. The double layer is configured by two layers made of different materials. The triple layer is configured by three layers, and materials of adjacent layers are different from each other. For example, the encapsulation layer 390 may include a layer made of an organic insulating material and a layer made of an inorganic insulating material.

Although not illustrated, polarizers may be further formed on upper and lower sides of the display device. The polarizers may be configured by a first polarizer and a second polarizer. The first polarizer may be attached onto the lower side of the substrate 110, and the second polarizer may be attached onto the encapsulation layer 390.

Next, one pixel of the display device according to the exemplary embodiment will be described below with reference to FIGS. 6 to 8.

Figure 6:
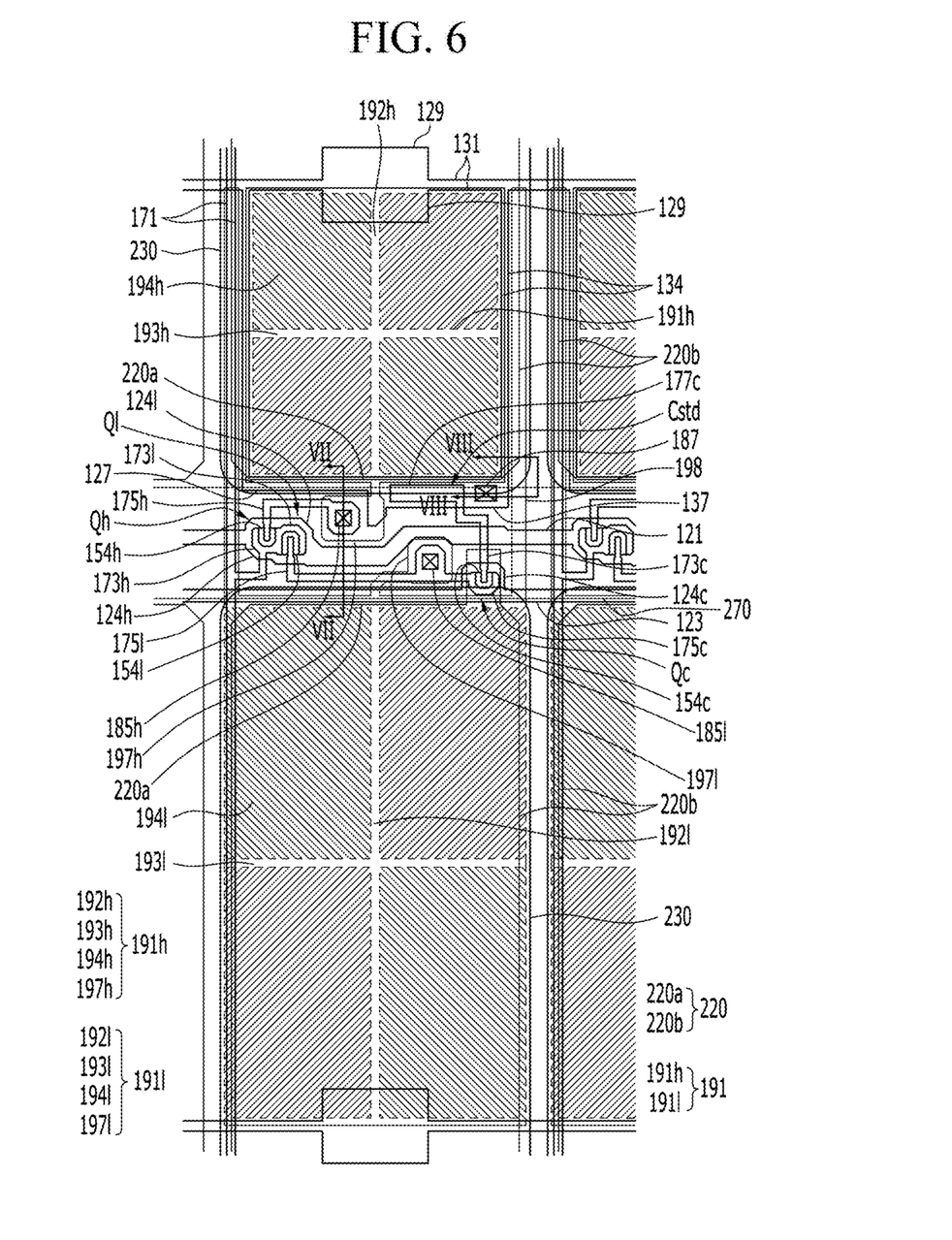
FIG. 6 is a plan view illustrating one pixel of a display device according to an exemplary embodiment of the inventive concept.
Figure 7:
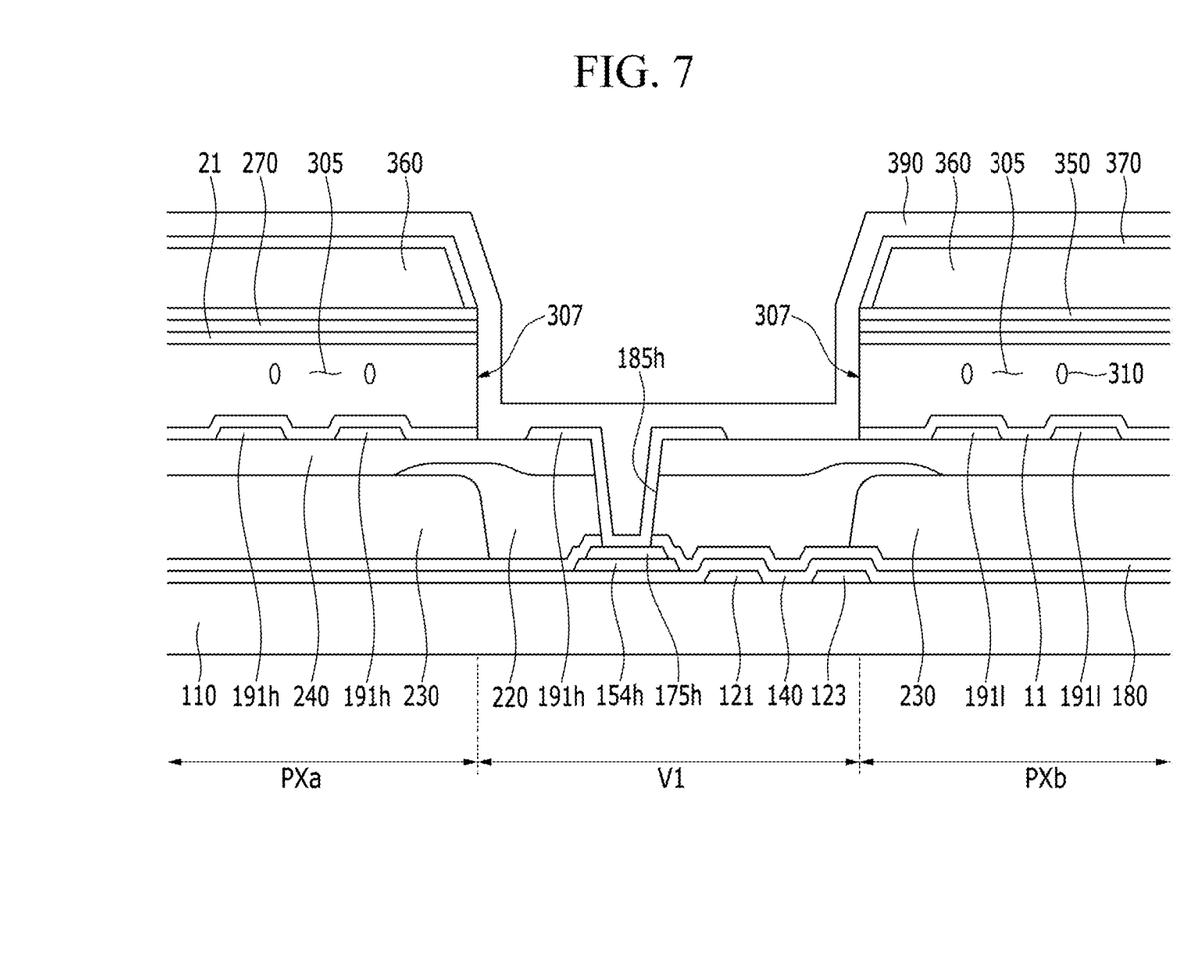
FIG. 7 is a cross-sectional view illustrating a part of the display device of FIG. 6 taken along line VII-VII according to the exemplary embodiment of the inventive concept.
Figure 8:
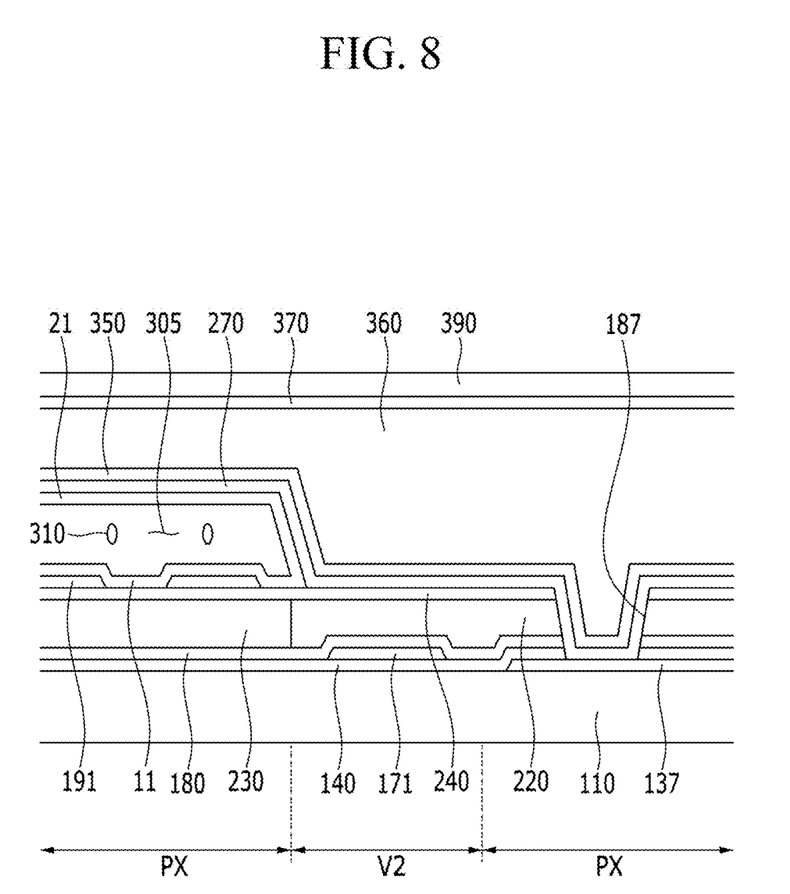
FIG. 8 is a cross-sectional view illustrating a part of the display device of FIG. 6 taken along line VIII-VIII according to an exemplary embodiment of the inventive concept.

Since the display device according to an exemplary embodiment of FIGS. 6 to 8 is almost the same as the display device according to the exemplary embodiment of FIGS. 1 to 5, any redundant description is omitted.

FIG. 6 is a plan view illustrating one pixel of the display device according to an exemplary embodiment of the inventive concept, FIG. 7 is a cross-sectional view illustrating a part of the display device taken along line VII-VII of FIG. 6 according to the exemplary embodiment, and FIG. 8 is a cross-sectional view illustrating a part of the display device taken along line VIII-VIII of FIG. 6 according to the exemplary embodiment.

Referring to FIGS. 6 to 8, a plurality of gate conductors including a plurality of gate lines 121, a plurality of step-down gate lines 123, and a plurality of storage electrode lines 131 is formed on the substrate 110.

The gate line 121 and the step-down gate line 123 mainly extend in a horizontal direction to transfer gate signals. The gate conductor further includes a first gate electrode 124h and a second gate electrode 124l protruding upward and downward from the gate line 121, and further includes a third gate electrode 124c protruding upward from the step-down gate line 123. The first gate electrode 124h and the second gate electrode 124l are connected with each other to form one protrusion. In this case, the protruding form of the first, second, and third gate electrodes 124h, 124l, and 124c may be modified.

The storage electrode line 131 mainly extends in a horizontal direction and transfers a predetermined voltage such as a common voltage Vcom. The storage electrode line 131 includes storage electrodes 129 protruding upward and downward, a pair of vertical portions 134 extending downward to be substantially vertical to the gate line 121, and a horizontal portion 127 connecting ends of the pair of vertical portions 134. The horizontal portion 127 includes a capacitor electrode 137 expanded downward.

A gate insulating layer 140 is formed on the gate conductor 121, 123, 124h, 124l, 124c, and 131. The gate insulating layer 140 may be made of an inorganic insulating material such as silicon nitride (SiNx) and silicon oxide (SiOx). Further, the gate insulating layer 140 may be formed as a single layer or a multiple layer.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124l, and the third semiconductor 154c may be positioned on the third gate electrode 124c. The first semiconductor 154h and the second semiconductor 154l may connect to each other, and the second semiconductor 154l and the third semiconductor 154c may connect to each other. Further, the first semiconductor 154h may extend to the lower portion of the data line 171. The first to third semiconductors 154h, 154l, and 154c may be made of amorphous silicon, polycrystalline silicon, metal oxide, and the like.

Ohmic contact members (not illustrated) may be further formed on the first to third semiconductors 154h, 154l, and 154c, respectively. The ohmic contact member may be made of silicide or a material such as n+ hydrogenated amorphous silicon in which n-type impurity is doped at a high concentration.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 151h, 154l, and 154c.

The data line 171 transfers a data signal and mainly extends in a vertical direction to cross the gate line 121 and the step-down gate line 123.

The first source electrode 173h and the second source electrode 173l are connected with the data line 171, and formed on the first gate electrode 124h and the second gate electrode 124l, respectively. The first source electrode 173h and the second source electrode 173l are connected with each other.

Each of the first drain electrode 175h and the second drain electrode 175l includes one wide end portion and the other rod-shaped end portion. The rod-shaped end portions of the first drain electrode 175h and the second drain electrode 175l are partially surrounded by the first source electrode 173h and the second source electrode 173l, respectively. One wide end portion of the second drain electrode 175l extends to form a third drain electrode 175c which is bent in a 'U'-lettered shape.

The third source electrode 173c includes a wide end portion and a rod-shaped end portion. A wide end portion 177c of the third source electrode 173c overlaps with the capacitive electrode 137 to form a step-down capacitor Cstd, and the rod-shaped end portion is partially surrounded by the third drain electrode 175c.

The first gate electrode 124h, the first source electrode 173h, and the first drain electrode 175h form a first thin film transistor Qh together with the first semiconductor 154h, the second gate electrode 124l, the second source electrode 173l, and the second drain electrode 175l form a second thin film transistor Ql together with the second semiconductor 154l, and the third gate electrode 124c, the third source electrode 173c, and the third drain electrode 175c form the third thin film transistor Qc together with the third semiconductor 154c.

The first semiconductor 154h, the second semiconductor 154l, and the third semiconductor 154c may be connected to each other, and may have substantially the same planar shape as the data conductor 171, 173h, 173l, 173c, 175h, 175l, and 175c and the ohmic contact members therebelow, except for channel regions between the source electrodes 173h, 173l, and 173c and the drain electrodes 175h, 175l, and 175c.

In the first semiconductor 154h, a portion that is not covered by the first source electrode 173h and the first drain electrode 175h is disposed between the first source electrode 173h and the first drain electrode 175h. In the second semiconductor 154l, an exposed portion which is not covered by the second source electrode 173l and the second drain electrode 175l is disposed between the second source electrode 173l and the second drain electrode 175l. In addition, in the third semiconductor 154c, a portion that is not covered by the third source electrode 173c and the third drain electrode 175c is disposed between the third source electrode 173c and the third drain electrode 175c.

A passivation layer 180 is formed on the data conductor 171, 173h, 173l, 173c, 175h, 175l, and 175c and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed as a single layer or multiple layers.

A color filter 230 in each pixel PX is formed on the passivation layer 180. Each color filter 230 may display one of the primary colors such as three primary colors of red, green and blue. The color filter 230 is not limited to the three primary colors of red, green and blue, but may display cyan, magenta, yellow, and white-based colors. Unlike the embodiments illustrated above, the color filter 230 may extend in a column direction along a space between the adjacent data lines 171.

A light blocking member 220 is formed in a region between the adjacent color filters 230. The light blocking member 220 is formed on a boundary of the pixel PX and the thin film transistor to prevent light leakage. The color filter 230 is formed in each of the first subpixel PXa and the second subpixel PXb, and the light blocking member 220 may be formed between the first subpixel PXa and the second subpixel PXb.

The light blocking member 220 extends along the gate line 121 and the step-down gate line 123 to be expanded upward and downward, and includes a horizontal light blocking member 220a which covers regions where the first thin film transistor Qh, the second thin film transistor Ql, and the third thin film transistor Qc are positioned, and a vertical light blocking member 220b which extends along the data line 171. That is, the horizontal light blocking member 220a may be formed at the first valley V1, and the vertical light blocking member 220b may be formed at the second valley V2. The color filter 230 and the light blocking member 220 may overlap with each other in a partial region.

A first insulating layer 240 may be further formed on the color filter 230 and the light blocking member 220. The first insulating layer 240 is made of an organic insulating material, and may serve as a planarization layer for a step formed between the color filter 230 and the light blocking member 220. Further, the first insulating layer 240 may be made of an inorganic insulating material such as silicon nitride (SiNx) and silicon oxide (SiOx). The first insulating layer 240 may be omitted in some cases.

In the first insulating layer 240, the light blocking member 220, and the passivation layer 180, a plurality of first contact holes 185h and a plurality of second contact holes 185l, which expose the wide end portion of the first drain electrode 175h and the wide end portion of the second drain electrode 175l, respectively, are formed.

A pixel electrode 191 is formed on the first insulating layer 240. The pixel electrode 191 may be made of a transparent metal material such as indium tin oxide (ITO) and indium zinc oxide (IZO).

The pixel electrode 191 includes a first subpixel electrode 191h and a second subpixel electrode 191l which are separated from each other with the gate line 121 and the step-down gate line 123 therebetween, and disposed above and below the pixel PX based on the gate line 121 and the step-down gate line 123 to be adjacent to each other in a column direction. That is, the first subpixel electrode 191h and the second subpixel electrode 191l are separated from each other with the first valley V1 therebetween, the first subpixel electrode 191h is positioned in the first subpixel PXa, and the second subpixel electrode 191l is positioned in the second subpixel PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first subpixel electrode 191h and the second subpixel electrode 191l receive data voltages from the first drain electrode 175h and the second drain electrode 175l.

Each of the subpixel electrode 191h and the second subpixel electrode 191l is generally quadrangular in shape, and the first subpixel electrode 191h and the second subpixel electrode 191l include cross stems including horizontal stems 193h and 193l and vertical stems 192h and 192l crossing the horizontal stems 193h and 193l, respectively. Further, the first subpixel electrode 191h and the second subpixel electrode 191l include a plurality of minute branches 194h and 194l, and protrusions 197h and 197l protruding downward or upward from edge sides of the subpixel electrodes 194h and 194l, respectively.

The pixel electrode 191 is divided into four subregions by the horizontal stems 193h and 193l and the vertical stems 192h and 192l. The minute branches 194h and 194l obliquely extend from the horizontal stems 193h and 193l and the vertical stems 192h and 192l and the extending direction may form an angle of approximately 45 degrees or 135 degrees with the gate line 121 or the horizontal stems 193h and 193l. Further, extending directions of the minute branches 194h and 194l of the two adjacent subregions may be perpendicular to each other.

In the exemplary embodiment, the first subpixel electrode 191h further includes an outer stem surrounding the outside, and the second subpixel electrode 191l further includes horizontal portions positioned at an upper end and a lower end, and left and right vertical portions 198 positioned at the left and right sides of the first subpixel electrode 191h. The left and right vertical portions 198 may prevent capacitive coupling, that is, coupling between the data line 171 and the first subpixel electrode 191h.

The layout form of the pixel, the structure of the thin film transistor, and the shape of the pixel electrode described above are just exemplified, and the present invention is not limited thereto and may be variously modified.

The common electrode 270 is formed on the pixel electrode 191 so as to be spaced apart from the pixel electrode 191 at a predetermined distance. The microcavity 305 is formed between the pixel electrode 191 and the common electrode 270. That is, the microcavity 305 is surrounded by the pixel electrode 191 and the common electrode 270. The common electrode 270 is formed in a row direction, and formed on the microcavity 305 and at the first valley V1 and the second valley V2. The common electrode 270 is formed to cover an upper surface and a side of the microcavity 305. A width and an area of the microcavity 305 may be variously modified according to a size and a resolution of the display device.

In each pixel PX, the common electrode 270 is formed to be separated from the substrate 110 and thus the microcavity 305 is formed, but the common electrode 270 is formed to be attached to the substrate 110 at the first valley V1 and the second valley V2. At the second valley V2, the common electrode 270 is formed directly on the first insulating layer 240. A space is not formed between the first insulating layer 240 and the common electrode 270.

Figure 9:
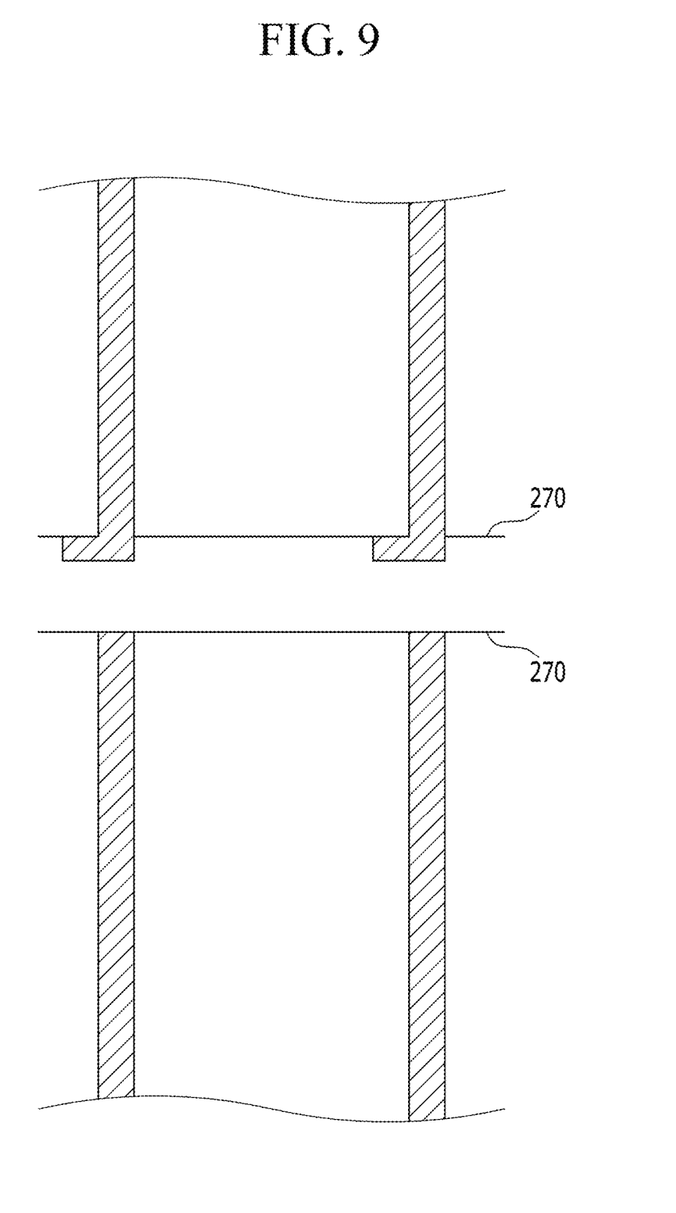
FIG. 9 is a layout view illustrating a common electrode of the display device according to an exemplary embodiment of the inventive concept.

FIG. 9 depicts the common electrode 270 of a display device according to an exemplary embodiment of the present inventive concept. A portion of the common electrode 270 that is attached to the substrate 110 is indicated by shading.

A planar shape of the portion where the common electrode 270 is attached to the substrate 110 has an L-shape. The portion where the common electrode 270 is attached to the substrate 110 includes a portion that overlaps the data line 171 and a portion overlapping the capacitive electrode 137, and the two portions are connected with each other.

The common electrode 270 overlaps the capacitive electrode 137. Insulating layers such as the gate insulating layer 140, the passivation layer 180, the light blocking member 220, and the first insulating layer 240 are formed between the capacitive electrode 137 and the common electrode 270. A fourth contact hole 187 is formed in the insulating layers. The fourth contact hole 187 passing through the gate insulating layer 140, the passivation layer 180, the light blocking member 220, and the first insulating layer 240 is formed to extend to at least a part of the capacitive electrode 137. The fourth contact hole 187 is positioned at the first valley V1, and adjacent to the data line 171. The fourth contact hole 187 does not expose the data line 171 and the third source electrode 173c.

The common electrode 270 is connected with the capacitive electrode 137 through the fourth contact hole 187. The common electrode 270 is connected with the capacitive electrode 137 at a position adjacent to the data line 171. The common electrode 270 is connected with the capacitive electrode 137 at the first valley V1. Since the capacitive electrode 137 is connected with the storage electrode line 131, the common electrode 270 is electrically connected to the storage electrode line 131. The common electrode 270 directly contacts the capacitive electrode 137, and the common electrode 270 is indirectly connected with the storage electrode line 131 through the capacitive electrode 137. In this case, since the fourth contact hole 187 does not extend to the data line 171 and the third source electrode 173c, the data line 171 and the third source electrode 173c are not connected with the common electrode 270.

In the exemplary embodiment, a plurality of common electrodes 270 is formed in a row direction. Accordingly, the resistance of the common electrode 270 may be increased in comparison with a case where the common electrode 270 is formed on substantially the entire surface of the substrate 110 as one planar electrode. In the exemplary embodiment, the resistance of the common electrode 270 may be reduced by connecting the common electrode 270 with the storage electrode line 131. In this case, the same common voltage may be applied to the storage electrode line 131 and the common electrode 270.

The common electrode 270 connects to the storage electrode line 131 at a place away from the microcavities 305 and specifically, away from the injection holes 307a, 307b, such that the connection does not interfere with injection of material into the microcavities 305.

The common electrode 270 may be made of a transparent metal material such as indium tin oxide (ITO) and indium zinc oxide (IZO). A predetermined voltage may be applied to the common electrode 270, and an electric field may be generated between the pixel electrode 191 and the common electrode 270.

A first alignment layer 11 is formed on the pixel electrode 191, and a second alignment layer 21 is formed below the common electrode 270 to face the first alignment layer 11.

A liquid crystal layer containing liquid crystal molecules 310 is formed in the microcavity 305 positioned between the pixel electrode 191 and the common electrode 270.

A third insulating layer 350 may be further formed on the common electrode 270, and a roof layer 360 is formed on the third insulating layer 350. The roof layer 360 may be made of an organic material. The microcavity 305 is formed below the roof layer 360, and the roof layer 360 is hardened by a curing process to maintain the shape of the microcavity 305. That is, the roof layer 360 is formed to be spaced apart from the pixel electrode 191 with the microcavity 305 therebetween.

The roof layer 360 is formed at each pixel PX along a pixel row and the second valley V2, and is formed in a partial region of the first valley V1. The roof layer 360 has substantially the same planar shape as the common electrode 270. The common electrode 270 is formed in the partial region of the first valley V1 so as to be connected with the capacitive electrode 137, and the roof layer 360 is formed at the corresponding portion. In the first valley V1 and the second valley V2, the microcavity 305 is not formed below the roof layer 360, but formed to be attached to the substrate 110. Accordingly, a thickness of the roof layer 360 positioned at the first valley V1 and the second valley V2 may be larger than a thickness of the roof layer 360 positioned at each of the first subpixel PXa and the second subpixel PXb. The upper surface and both sides of the microcavity 305 are formed to be covered by the roof layer 360.

An injection hole 307 exposing a part of the microcavity 305 is formed in the roof layer 360.

A fourth insulating layer 370 may be further formed on the roof layer 360, and an encapsulation layer 390 may be formed on the fourth insulating layer 370.

Although not illustrated, polarizers may be further formed on upper and lower sides of the display device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
| --- | --- |
| 121: Gate line | 131: Storage electrode line |
| 137: Capacitive electrode | 171: Data line |
| 171h: First data line | 171l: Second data line |
| 191: Pixel electrode | 270: Common electrode |
| 305: Microcavity | 360: Roof layer |
| 390: Encapsulation layer | |

What is claimed is:

1. A display device, comprising:
a substrate;
a gate line, a data line, and a storage electrode line formed on the substrate;
a thin film transistor connected to the gate line and the data line;
a pixel electrode connected with the thin film transistor;
a common electrode formed on the pixel electrode;
a plurality of microcavities between the common electrode and the pixel electrode;
a roof layer formed on the common electrode;
a liquid crystal layer in the microcavity; and
an encapsulation layer formed on the roof layer to seal the microcavity,
wherein the common electrode is connected with the storage electrode line at a position adjacent to the data line, spaced apart from the microcavities.

2. The display device of claim 1, wherein:
the microcavities are disposed in a matrix form, and
the display device further include first valleys positioned between the microcavities which are adjacent to each other in a column direction, and
second valleys positioned between the microcavities which are adjacent to each other in a row direction.

3. The display device of claim 2, wherein:
the common electrode is connected with the storage electrode line at the second valley.

4. The display device of claim 3, wherein:
the data line includes a first data line and a second data line, and
the first data line and the second data line are positioned at both edges of the second valley, respectively.

5. The display device of claim 4, further comprising:
an insulating layer formed between the storage electrode line and the common electrode, and
a contact hole extending through the insulating layer to at least a part of the storage electrode line positioned between the first data line and the second data line,
wherein the common electrode is connected with the storage electrode line through the contact hole.

6. The display device of claim 5, wherein:
the contact hole is formed between the first data line and the second data line without reaching the first data line or the second data line.

7. The display device of claim 4, wherein:
the thin film transistor includes a first thin film transistor and a second thin film transistor,
the pixel electrode includes a first subpixel electrode and a second subpixel electrode,
the first thin film transistor is connected with the first data line and the first subpixel electrode, and
the second thin film transistor is connected with the second data line and the second subpixel electrode.

8. The display device of claim 7, wherein:
a data voltage applied to the second data line is different from a data voltage applied to the first data line.

9. The display device of claim 2, wherein:
the common electrode is connected with the storage electrode line in the first valley.

10. The display device of claim 9, wherein:
the common electrode is attached to the substrate in the first valley and the second valley.

11. The display device of claim 10, wherein:
a portion of the common electrode that is attached to the substrate has an L-shape.

12. The display device of claim 9, further comprising:
a capacitive electrode protruding from the storage electrode line,
wherein the common electrode is directly connected with the capacitive electrode.

13. The display device of claim 12, further comprising:
an insulating layer formed between the storage electrode line and the common electrode, and
a contact hole extending through the insulating layer to at least a part of the capacitive electrode,
wherein the common electrode is connected with the capacitive electrode through the contact hole.

* * * * *